July 18, 1950
J. E. BENSON
2,515,850
AUTOMATIC FREQUENCY SCANNING SYSTEM
Filed March 10, 1945
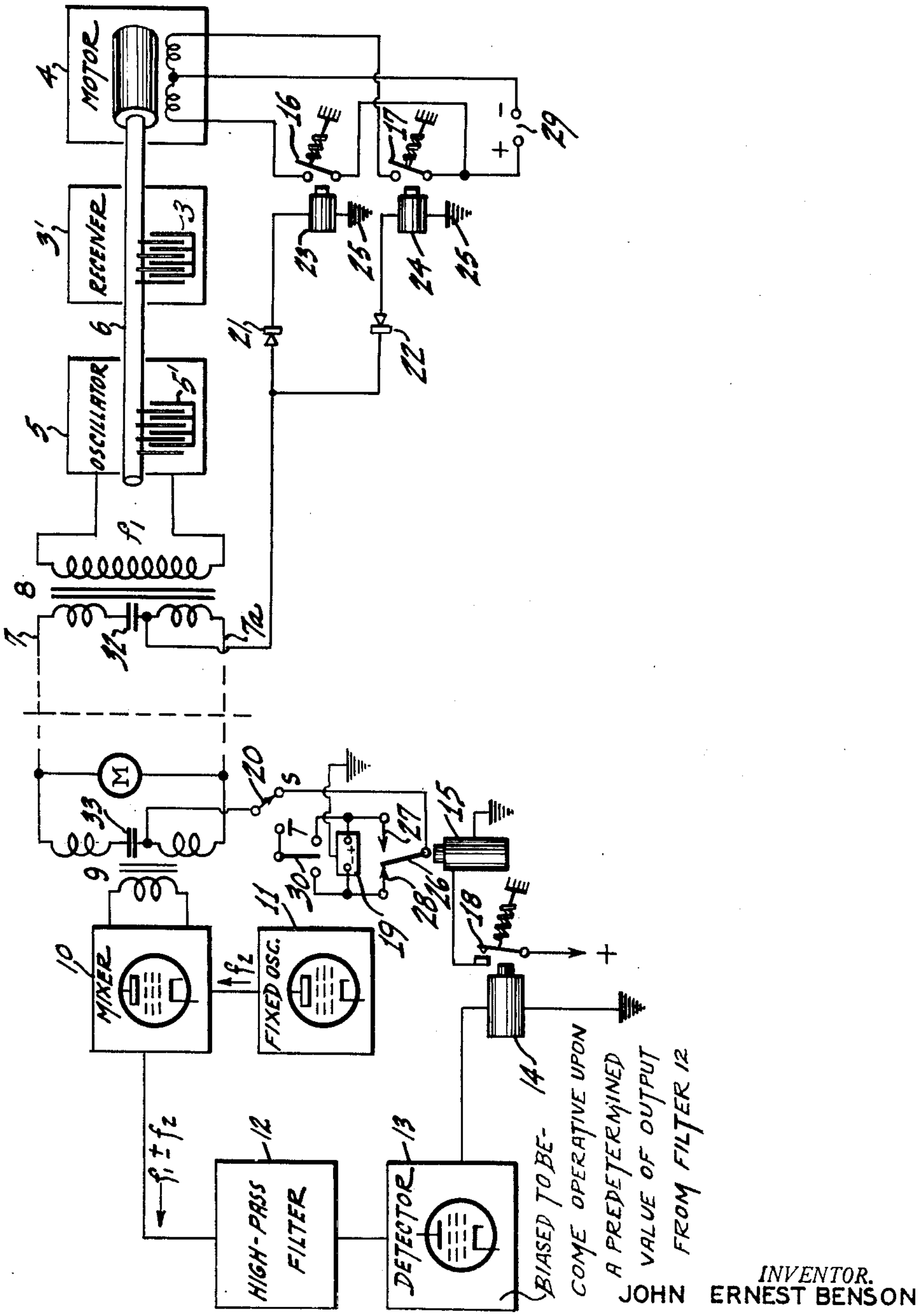
INVENTOR.
JOHN ERNEST BENSON
BY H. S. Grover
ATTORNEY Patented July 18, 1950 2,515,850

UNITED STATES PATENT OFFICE 2,515,850

AUTOMATIC FREQUENCY SCANNING SYSTEM

John E. Benson, Sydney, New South Wales, Australia, assignor to Amalgamated Wireless (Australasia) Limited, Sydney, New South Wales, Australia, a company of New South Wales Application March 10, 1945, Serial No. 581,989
In Australia March 3, 1944

Section 1, Public Law 690, August 8, 1946
Patent expires March 3, 1964

12 Claims. (Cl. 318—282)

The present invention relates to a system for continuously varying, either by local or remote control, the angular position of a rotatable member through a predetermined arc of movement.

Many applications exist in which the necessity arises for continuously varying the angular position of a rotatable member coupled to or attached to a shaft or other suitable driving member capable of imparting angular movement to the rotatable member.

One particular application to which this invention is especially directed is that of continuously varying the tuning, of a radio receiver, through a predetermined narrow band of frequencies.

In radio communication services it is often necessary to provide a supervisory receiving watch, over a band of frequencies, in order to intercept the transmission of any station operating within the limits of the band. It is also often desired to receive the transmission of a station whose operating frequency is not accurately known.

In order to carry out these requirements it becomes necessary to either (*a*) make the frequency response characteristic of the receiver sufficiently broad to permit the receiver to amplify equally all frequencies within the band of frequencies to be covered, or (*b*) to adjust the tuning element of the receiver in such a manner as to continuously vary the tuning of said receiver within the limits of the selected band of frequencies.

The suggestion (*a*) above is unsatisfactory because, due to the poor selectivity, the ratio of desired signal to noise or to undesired signal is poor and the reception of a weak desired signal in the presence of a stronger signal operating on an adjacent frequency would be exceedingly difficult if not impossible.

The suggesion (*b*) above provides the more satisfactory arrangement and various methods have been suggested in the past, both manual and automatic, for locally or remotely controlling the receiver tuning in the required manner.

All of these prior art methods, however, possess disadvantages which limit the scope of their usefulness. For example, any method of manually sweeping the receiver tuning over the desired frequency band is exceedingly tedious in practice and requires the constant attendance of an operator. Where the frequency sweeping operation is to be carried out over long periods an uneconomical expenditure of operating personnel is involved.

Automatic arrangements, on the other hand, avoid the disadvantages attached to manual methods, but as at present practiced such automatic arrangements are restricted more or less to local operation. If the automatic operation is to be carried out under remote control, additional equipment and control functions over and above the normal remote control tuning requirements of the system are necessary. This not only increases the cost of the equipment, but also restricts the useful band of frequencies which may be simultaneously transmitted over the system and undesirably complicates the design of the equipment.

Another disadvantage in prior art automatic frequency scanning systems is that the width of the band of frequencies covered by the scanning action for different portions of the frequency ranges of the equipment is determined not by the requirements of the service to be performed, but by the inherent characteristics of the particular system employed and is not readily alterable, especially when the equipment is being operated by remote control.

A further disadvantage in prior art automatic scanning systems is that it is difficult, without complicating the design of the equipment, to provide accurate telemetering arrangements whereby the operator at the control point is provided with a continuous and accurate visual indication of the instantaneous position of the tuning control element at the receiver during the scanning operation.

The principal object of the present invention is to provide an improved means for automatically varying the angular position of a rotatable member through a predetermined arc of movement, said means being readily adaptable for either local or remote control and in which the disadvantages outlined above in connection with prior art systems, are substantially avoided.

An ancillary object of the invention is to provide an improved means for automatically varying the position of the tuning element in a radio receiver in such a manner as to cause the receiver tuning to sweep backwards and forwards over a predetermined band of frequencies, the arrangement being such that a wide range of adjustment is possible with regard to (*a*) the band width over which the scanning is performed, and (*b*) the location of the mid-point of the scanning band or arc of movement, both of these parameters being adjustable by local or remote control by electrical means at the control end and without any additional equipment being required.

A further object of the invention therefore is to provide a system of the type referred to and which facilitates the continuous visual indication of the instantaneous angular position of the member being controlled.

The above objects are achieved, in accordance with the present invention, by providing, in a system for continuously varying the angular rotation of a movable member through a predetermined arc of movement, a first oscillator whose output frequency is dependent upon the angular position of said movable member, a further oscillator having a fixed frequency output, means for combining the output frequencies of both of said oscillators to produce a beat frequency which is passed through a high pass filter, means for rectifying the beat frequencies passed by said filter and for utilizing the resulting D. C. component to control the direction of rotation of a reversible driving means coupled to the said movable member.

For a more complete understanding of the invention and the manner in which it is to be carried out, attention is now directed to the accompanying drawing which schematically illustrates, by way of example, one practical embodiment of the invention.

As the individual components of the apparatus employed in the system may be constructed in accordance with well-known teachings, such components are shown in block form in the drawing in order to simplify the description.

Referring now to the drawing, the rotatable member, whose angular position is to be varied in accordance with the invention is indicated by the reference character 3.

Although the present embodiment of the invention is directed to an application in which the rotatable member 3 is the tuning element of a radio receiver represented by block 3', the invention is equally applicable to any rotatable member whose angular position is to be varied through a predetermined angle of movement.

The rotatable member 3 is coupled to any convenient driving means having two directions of rotary movement, such as the reversible motor 4 shown in the illustrated example.

An oscillator 5 has its frequency controlling element 5' suitably coupled, as indicated by shaft 6, to the rotatable member 3 so that any angular movement of the member 3 will produce a corresponding movement of the frequency controlling element of the oscillator 5. A variation in the frequency controlling element of the oscillator 5 will produce a resultant variation in the output frequency of said oscillator.

From the foregoing it readily will be appreciated that, as the angular position of the rotatable member 3 is varied, the output frequency of the oscillator 5 also will vary and that the instantaneous frequency in the output of oscillator 5 will at all times characterize the instantaneous angular position of the rotatable member 3. For example, if, with the rotatable member 3 in the zero position, the output frequency of the oscillator is 3,000 cycles, then, as the angular position of member 3 is varied through 360 degrees the circuit contents of the oscillator 5 may be so chosen that the movement produces, under ideal conditions, a linear frequency variation of 720 cycles in the output of the oscillator. This represents a frequency change of two cycles per degree of angular variation of the rotatable member 3. In these circumstances, if the angular movement of the member 3 is 360 degrees the resultant output frequency is 3,720 cycles, or if said movement is only 180 degrees the output frequency will then be only 3,360 cycles, and so on, a different output frequency being produced for each angular position of the member 3. The direction in which the frequency varies depends on the direction of movement of member 3.

The output frequency hereinafter referred to as $f1$, from oscillator 5 is fed, either directly or through a suitable coupling means indicated in the present example as the balanced line 7, 7a and associated line coupling transformers 8, 9, to the input of a convenient mixing circuit 10 wherein the frequency $f1$ is heterodyned with the output frequency $f2$, from a fixed frequency oscillator 11.

The beat frequency $f1 \sim f2$, which is present in the output of the mixer 10 as a result of the heterodyne action between frequencies $f1$ and $f2$, is fed directly, or if desired after suitable amplification, to a high pass filter 12, the output from which latter is fed either directly, or after amplification, to a biased detector 13.

The D. C. component of the rectified energy, in the output circuit of the detector 13, is caused to operate a relay 14 when the amplitude of the rectified D. C. component exceeds the static bias applied to the detector 13. The value of the static or delay bias for the rectifier is chosen so that the detector is rendered inoperative until the amplitude of the output of the filter 12 attains a predetermined value.

The operation of relay 14 serves to control a pulse-operated change-over relay 15 which may be employed to directly or indirectly control the alternate operation of the reversing switches 16, 17 and hence the direction of rotation of the motor 4.

The change-over relay 15 is of the well-known type which alternates between two stable conditions of operation. For example, on the closing of contacts 18 associated with relay 14 the relay 15 is energized and changes over from one condition of operation to the other and remains in this condition even after the contacts 18 of relay 14 open. On reclosing of contacts 18 as the result of further energization of relay 14, the relay 15 is again energized and changes back to the original condition. Where the equipment is employed for local automatic operation, the contact connections of relay 15 are such that in one condition of operation the reversing switch 16 is closed and the switch 17 is open, whilst in the other condition of operation the switch 17 is closed and the switch 16 is opened.

In the remote control application of the invention, as illustrated in the drawing, the change over contacts of relay 15 apply energizing potentials of positive or negative polarity from the current supply source 19 through a path comprising the manual switch 20, one half of the input winding of coupling transformer 9, the line 7a, one half of the output winding of transformer 8, the rectifier 21 or 22, through relay 23 or 24 to earth 25.

When the relay 15 is in the condition shown in the drawing and the switch 20 is in the S position, the polarity of the current from the supply source 19 is such that the conductive path is through the rectifier 22 and relay 24. The relay 24 is thus energized and operates to close the switch 17; whereby the motor 4 is connected to the supply source 29 and caused to rotate in one of its two possible directions. In the alternative condition of relay 15 connection is made between the arm 26 and the contact 27. The polarity of the current is reversed and due to the unidirectional conductivity of the rectifiers 21, 22 the conductivity path is now through the rectifier 21 and the relay 23, instead of through rectifier 22 and relay 24 as previously. The relay 24 is thus deenergized and opens switch 17, whilst the relay 23 is energized to close the switch 16, which causes the motor 4 to reverse and rotate in the opposite direction.

The operation of the system is as follows: Assume for example that 180° of angular movement of the member 3 causes the output frequency of the oscillator 5 to vary between 3,000 and 3,360 cycles. In order to carry out the invention the oscillator 11 must be adjusted to provide a constant output frequency $f2$, within the band of frequencies produced by the oscillator 5, the specific value of $f2$ depending upon the angular position of the mid-point about which the member 3 is required to rotate.

If the arc of movement is required to extend over 40 degrees of angular rotation of the member 3, the frequency change produced in the output of the oscillator 5 will, in accordance with the present example, be 80 cycles or 40 cycles either side of the mid-point.

If now a high pass filter 12 having a change-over frequency of 40 cycles is selected and if the frequency $f2$ is adjusted to correspond to the output frequency of the oscillator 5 at the mid-point of the required angular movement, the system will function to cause the member 3 to be automatically rotated backwards and forwards through the required arc of movement.

For the purpose of the present description the term "change-over frequency" is intended to mean the frequency at which the output of the high-pass filter is of sufficient amplitude to operate, after rectification, the relay 14, and hence the change-over relay 15. This frequency in general is slightly less than the nominal cut-off frequency of the filter 12 and is determined by several factors, including the cut-off slope of the filter, the bias of the rectifier and the sensitivity of the relay.

More specifically, if the mid-point of the required arc of movement is, say 70 degress then the output frequency of the oscillator 5 at this point will be 3,140 cycles. If now the oscillator 11 is adjusted to provide a constant output frequency of 3,140 cycles and the switch 20 placed in the S position, the existing condition of contacts 26, 27, 28 of the change-over relay 15 will cause the motor 4 to rotate in one of its two possible directions.

As the motor 4 rotates, the output frequency of the oscillator 5 will vary as also will the beat frequency in the output of the mixer 10. The beat frequency will increase from zero value, which represents the mid-point of the movement of the member 3, towards the pass frequency of the filter 12.

As the beat frequency in the output of the mixer 10 approaches the pass frequency of the filter 12 as a result of the frequency variation produced in the output of the oscillator 5 by the continued movement of the member 3, the amplitude of the output from the filter 12 will increase due to the sloping nature of the cut-off characteristic.

When the beat frequency increases to a value of 40 cycles the amplitude of the output of the filter 12 is sufficient to over-ride the delay bias on the detector 13 and current flows in the output of the detector 13, thus energizing the relay 14.

Energization of the relay 14 operates the contacts 18 and a current pulse is applied to the relay 15 causing it to operate to its alternative condition, thus reversing the direction of rotation of the motor 4 in the manner already described.

Reversal of the direction of movement of member 3 causes the output frequency from the oscillator 5 to vary in the opposite direction. The beat note in the output of the mixer 10 consequently decreases in value to the zero beat condition as the member 3 comes to the mid-point of the required movement. As the rotatable member 3 passes the mid-point and continues its direction of movement, the beat frequency will start to increase in value again and will continue to do so until the movement of member 3 causes it to reach a value in the vicinity of 40 cycles at which point the amplitude of the energy passed by filter 12 is again sufficient to cause the relay 14 to operate whereby the relay 15 is changed over to its original condition and the direction of rotation of motor 4 again is reversed.

This cycle of operation will be repeated and the movable member 3 will continue to scan backwards and forwards over the pre-determined arc until the scanning circuit is interrupted by movement of the switch 20 to the T position.

With the switch 20 in the T position, the switch unit comprising contacts 26, 27, 28 is replaced in the motor control circuit by the switch 30. The latter is connected across the current supply source 19 and when manually operated functions to control the direction of rotation of motor 4 by applying the current of different polarity through the circuit in a similar manner to that already described in connection with the operation of switch arm 26.

From the foregoing description of the operation of the invention it will be readily appreciated that, while the switch 20 is in the S position, the mid-point of the arc of movement of the member 3 may be quickly and effectively changed by simply adjusting the output frequency $f2$ from the oscillator 11 to a value which corresponds with the output frequency of the oscillator 5 at the desired mid-point position.

In the present example, irrespective of the location of the desired mid-point within 20 degrees of either limit of the full range of movement of member 3, e. g. between 20 and 160 degrees, angular movement of member 3 will be effected on either side of the selected mid-point so long as the cut-off frequency of the filter 12 remains at 40 cycles.

The angle of movement of member 3 may be increased or decreased to any desired value by increasing or decreasing the cut-off frequency of the high pass filter 12, and hence the change-over frequency of the system. If, by way of example, it is desired to increase the arc of scan to 40 degrees of angular movement on either side of the mid-point, the change may be effected by increasing the change-over frequency of filter 12 to 80 cycles. This is because each degree of angular change in the rotatable member 3 in the assumed ideal conditions causes a frequency change of 2 cycles in the output frequency of the oscillator 5 and the amplitude of the output from the filter 12 now will not be sufficient to operate the relay 14 until the beat frequency reaches a value of 80 cycles.

In actual practice, however, the frequency change per degree of angular movement is not restricted to the 2 cycles per degree quoted for the purpose of explaining the present example; it may be of greater or lesser value according to requirements of a particular application without affecting the scope of the invention. Moreover, the frequency change per degree of angular movement may not follow a linear law over the full range of movement of member 3. This is not detrimental to the fundamental operation of the invention. Such non-linearity, however, will only affect the equality of the length of scan at various positions of the mid-point of the movement. This condition may be compensated by suitable adjustment of the cut-off frequency of filter 12.

If visual indication of the instantaneous angular position of member 3 is required, this readily may be effected by the use of a calibrated frequency meter M which is generally connected at a convenient point in the circuit to receive and to visually indicate the output frequency from the oscillator 5.

The use of a calibrated frequency meter as a visual indicator provides for continuous indication of the angular position and/or movement of the member 3 irrespective of whether the apparatus is being manually or automatically operated by local or by remote control.

Although the motor control circuit is illustrated as utilizing only one half of the output and input windings of transformers 8 and 9 respectively, the isolating condensers 32, 33 may be omitted and both halves of the transformer windings employed if desired without affecting the operation of the invention.

The use of isolating condenser 32, 33 as shown in the drawing, permits the other half of the windings of transformers 8 and 9 to be employed for other control purposes.

Although, in the described example, currents of different polarity are employed in the circuit, controlling the operation of motor 4, it is to be understood that said currents may be replaced by different tone frequencies which may be transmitted with or without carrier component.

Further, such frequencies may be transmitted as modulation frequencies on a radio-frequency carrier, so that the system may be operated by radio-control.

Having now fully described and ascertained my said invention and the manner in which it is to be performed, I declare that what I claim is:

1. A system for continuously varying the angular position of a rotatable member through a predetermined arc of movement, comprising a reversible driving means coupled to said rotatable member, a first oscillator whose output frequency is dependent upon the angular position of said rotatable member, a further oscillator having a fixed frequency output, means for combining the output frequencies of both of said oscillators to produce a beat frequency which continuously varies between two predetermined limits, a high pass filter through which said variable beat frequency is passed, means for rectifying the beat frequency passed by said filter, and means for utilizing the resulting D. C. component to control the direction of rotation of said reversible driving means.

2. A system as claimed in claim 1, characterized in that a frequency control element in said first mentioned oscillator is ganged for simultaneous movement with said rotatable member.

3. A system as claimed in claim 1, characterized in that the output frequencies from said first mentioned oscillator are in the audio frequency range.

4. A system as claimed in claim 1, characterized in that the frequency of the fixed oscillator corresponds with one of the output frequencies produced in the output of said first mentioned oscillator.

5. A system as claimed in claim 1, characterized in that the frequency of the fixed oscillator determines the mid-point of the arc of angular movement through which said rotatable member travels.

6. A system as claimed in claim 1 characterized in that the beat frequency energy passed by said high pass filter is rectified by means of a rectifier in which rectification is delayed until the amplitude of the beat frequency attains a predetermined value.

7. A system as claimed in claim 1 characterized in that the said reversible driving means comprises an electric motor.

8. A system as claimed in claim 1, characterized in that the said reversible driving means comprises an electric motor and the D. C. component of the rectified output from the said high pass filter is utilized to actuate switches which control the direction of rotation of said motor.

9. A system as claimed in claim 1 characterized in that the rotatable member is located at a remote point and there is provided at a control point means for producing a continuous visual indication of the instantaneous angular position of said rotatable member.

10. A system as claimed in claim 1, characterized in that the rotatable member is located at a remote point and there is provided at a control point means for producing a continuous visual indication of the instantaneous angular position of said rotatable member, said visual indicating means being a frequency meter.

11. The method of continuously varying the angular position of a rotatable member which comprises, rotating said rotatable member, producing oscillations, varying said oscillations as a function of the angular position of said rotatable member, producing other oscillations of a fixed frequency within the band produced by said varying oscillations, combining the fixed frequency oscillations and the varying frequency oscillations, and utilizing energy representative of the combined oscillations for continually reversing the direction of rotation of said rotatable member when the difference in frequency between said varying oscillations and said fixed frequency oscillations reaches a predetermined value at either side of zero.

12. The method of continuously varying the angular position of a rotatable member which comprises, continuously rotating said rotatable member, producing oscillations which vary with the angular position of said rotatable member, producing other oscillations of a fixed frequency within the band produced by said varying oscillations, combining said fixed frequency oscillations and the varying frequency oscillations to produce a beat frequency which continuously varies between two predetermined limits, filtering the beat energy, rectifying the filtered energy to produce a direct current component, and continually reversing the direction of rotation of said rotatable member whenever the value of the direct current component is representative of a predetermined beat frequency defining the limit of travel of the rotatable member in any one direction of movement.

JOHN E. BENSON.

REFERENCES CITED

The following references are of record in the file of this patent:

UNITED STATES PATENTS

| Number | Name | Date |
|---|---|---|
| 2,387,544 | Usselman | Oct. 23, 1945 |